United States Patent
Edwards et al.

(10) Patent No.: US 12,400,189 B2
(45) Date of Patent: Aug. 26, 2025

(54) SYSTEMS AND METHODS FOR MACHINE LEARNING BASED EXECUTION OF ACTIONS BASED ON CALENDAR EVENT DATA

(71) Applicant: Capital One Services, LLC, McLean, VA (US)

(72) Inventors: Joshua Edwards, Carrollton, TX (US); Jason Zwierzynski, Chapel Hill, NC (US); Abhay Donthi, Washington, DC (US); Sara Rose Brodsky, New York, NY (US); Jennifer Kwok, Brooklyn, NY (US); Tania Cruz Morales, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 174 days.

(21) Appl. No.: 18/057,446

(22) Filed: Nov. 21, 2022

(65) Prior Publication Data

US 2024/0169324 A1 May 23, 2024

(51) Int. Cl.
*G06Q 10/00* (2023.01)
*G06Q 10/1093* (2023.01)

(52) U.S. Cl.
CPC ................ *G06Q 10/1097* (2013.01)

(58) Field of Classification Search
None
See application file for complete search history.

(56) References Cited

U.S. PATENT DOCUMENTS 8,033,453 B2   10/2011  Scanlon
8,719,132 B1    5/2014  Diggdon et al.
(Continued)

FOREIGN PATENT DOCUMENTS

TW      M563604 U      7/2018

OTHER PUBLICATIONS

Hedberg, Niclas, Automated invoice processing with machine learning, 2020, Degree Project in the Field of Technology Computer Science and Engineering and the Main Field of Study, https://kth.diva-portal.org/smash/get/diva2:1461111/FULLTEXT01.pdf, p. 1-80 (Year: 2020).*

Melanie Pinola, "Manage Your Money with Google Calendar," lifehacker, Aug. 3, 2012, retrieved from https://lifehacker.com/manage-your-money-with-google-calendar-5931560.

(Continued)

*Primary Examiner* — Joseph M Waesco
(74) *Attorney, Agent, or Firm* — Bookoff McAndrews, PLLC (57) ABSTRACT

A method for executing actions based on event data using machine learning is disclosed. The method comprises: receiving occasion data associated with a user; analyzing, using a trained machine learning model, the occasion data to identify an occasion associated with a first classification, wherein the trained machine learning model has been trained based on (i) training occasion data that includes information regarding one or more occasions associated with the training occasion data and (ii) training classification data that includes a prior classification for each of the occasions, to learn relationships between the training occasion data and the training classification data, such that the trained machine learning model is configured to use the learned relationships to identify an occasion associated with a first classification in response to input of the occasion data; determining an action based on the occasion associated with the first classification; and automatically executing the action.

20 Claims, 4 Drawing Sheets

(56) References Cited

U.S. PATENT DOCUMENTS

| | | | |
|---|---|---|---|
| 10,726,393 B2 | 7/2020 | Kaufman | |
| 10,851,636 B1* | 12/2020 | Basu | G06N 3/126 |
| 2019/0370915 A1* | 12/2019 | Garden | G06N 20/00 |
| 2021/0049499 A1* | 2/2021 | Ho | G06V 10/95 |
| 2021/0081377 A1* | 3/2021 | Polleri | G06F 8/75 |
| 2021/0142177 A1* | 5/2021 | Mallya | G06N 3/084 |
| 2021/0256502 A1* | 8/2021 | Taffer | G06Q 20/382 |
| 2022/0094647 A1* | 3/2022 | Le | G06F 17/18 |
| 2022/0207420 A1* | 6/2022 | Sharma | G06V 10/82 |
| 2022/0343250 A1* | 10/2022 | Tremblay | G06Q 10/0633 |

OTHER PUBLICATIONS

Mint update brings calendar app integration, view bills directly date-wise, Mar. 10, 2017, retrieved from https://nerdschalk.com/mint-money-manager-update/.

"Effortlessly stay on top of bills," retrieved from https://mint.intuit.com/how-mint-bills-works, on Nov. 10, 2022.

\* cited by examiner

SYSTEMS AND METHODS FOR MACHINE LEARNING BASED EXECUTION OF ACTIONS BASED ON CALENDAR EVENT DATA

TECHNICAL FIELD

Various embodiments of this disclosure relate generally to machine learning-based techniques for determining actions for automatic execution based on calendar event data, and, more particularly, to systems and methods for identifying occasions associated with classifications based on virtual calendar occasion data and classification data, and determining actions for automatic execution based on the identified occasions using machine learning models.

BACKGROUND

Numerous electronic tools and applications are available to assist users with planning and managing their daily activities and actions. For example, to schedule or plan financial payments or fitness activities, some users may use a virtual calendar, for example, cloud-based calendars such as Google Calendar®. Some users may also use financial planning-specific virtual calendars, for example, Intuit Mint®. To use these applications, users are typically required to manually input information associated with a deadline or task, for example, to pay a bill or schedule a call. Some financial applications, such as Mint®, may further track deadlines and notify a user of upcoming deadlines to pay bills or suggest that a user perform other activities. Users may additionally need to reference other applications to plan activities, for example, a user may check a fitness application to confirm various fitness goals (e.g., physical or mental fitness goals) are met, or check a medical health application to confirm that different appointments or medications have been received.

However, conventional techniques, including the foregoing, fail to address the issues arising from the use of many different applications for managing daily activities. In many cases, the use of multiple different tools for scheduling actions according to different classifications of activities can be error prone, as users are often required to switch between different applications. For example, a user may check their Google Calendar® daily, but might forget to check their Mint calendar or other calendar application or checklist to confirm that a payment deadline is met. Such a process can be redundant, frustrating, and time-consuming leading to user dissatisfaction and/or disengagement. There thus exists a need to reduce the number of applications needed to be accessed by a user to accomplish daily activities and meet financial deadlines.

This disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for determining actions for automatic execution based on occasions identified from calendar occasion data and classification data using one or more machine learning models.

In one aspect, an exemplary embodiment of a method for executing actions based on event data using one or more machine learning models may include: receiving occasion data from an electronic database associated with a user, wherein the electronic database includes a plurality of occasions; analyzing, using a trained machine learning model, the occasion data to identify an occasion associated with a first classification, wherein the trained machine learning model has been trained based on (i) training occasion data that includes information regarding one or more occasions associated with the training occasion data and (ii) training classification data that includes a prior classification for each of the one or more occasions, to learn relationships between the training occasion data and the training classification data, such that the trained machine learning model is configured to use the learned relationships to identify an occasion associated with a first classification in response to input of the occasion data; upon identifying the occasion associated with the first classification, determining an action based on the occasion associated with the first classification; and automatically executing the action.

In an additional aspect, an exemplary embodiment of a method for executing actions based on event data using machine learning models may include: receiving occasion data from an electronic database associated with a user, wherein the electronic database includes a plurality of occasions; analyzing, using a first trained machine learning model, the occasion data to identify an occasion associated with a first classification, wherein the first trained machine learning model has been trained based on (i) training occasion data that includes information regarding one or more occasions associated with the training occasion data and (ii) training classification data that includes a prior classification for each of the one or more occasions, to learn relationships between the training occasion data and the training classification data, such that the trained machine learning model is configured to use the learned relationships to identify an occasion associated with a first classification in response to input of the occasion data; upon identifying the occasion associated with the first classification, determining, using a second trained machine learning model, an action based on the occasion associated with the first classification, wherein the second trained machine learning model has been trained based on (i) training classification data that includes information regarding one or more occasions associated with the first classification and (ii) training action data that includes prior actions for each of the one or more occasions associated with the first classification, to learn relationships between the training classification data and the training action data, such that the trained machine learning model is configured to use the learned relationships to determine an action in response to input of the occasion associated with the first classification; and automatically executing the action.

In a further aspect, an exemplary embodiment of a system for executing actions based on event data using machine learning models may include: a memory storing instructions; and a processor operatively connected to the memory and configured to execute the instruction to perform operations. The operations may include: receiving occasion data from an electronic database associated with a user, wherein the electronic database includes a plurality of occasions; analyzing, using a trained machine learning model, the occasion data to identify an occasion associated with a first classification, wherein the trained machine learning model has been trained based on (i) training occasion data that includes information regarding one or more occasions associated with the training occasion data and (ii) training classification data that includes a prior classification for each of the one or more occasions, to learn relationships between the training occasion data and the training classification data, such that the trained machine learning model is configured to use the learned relationships to identify an occasion associated with a first classification in response to input of the occasion data; upon identifying the occasion associated with the first classification, determining an action based on the occasion associated with the first classification; and automatically executing the action.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

According to certain aspects of the disclosure, methods and systems are disclosed for determining and automatically executing actions based on occasions identified from calendar occasion data (e.g., virtual calendar occasion data) and classification data, e.g., using one or more trained machine learning models. According to aspects of the disclosure, a virtual calendar may refer to any computer or internet-based calendar, application, or software for scheduling and/or managing events or tasks relevant to a user, such as, for example, Google Calendar®, Outlook®, iCloud Calendar®, and the like. Conventionally, users are required to access multiple different virtual calendaring, scheduling, and banking applications in order to view calendars and schedule or authorize payments. However, conventional techniques may not be suitable as stated above. For example, conventional techniques may not allow for the use of one calendar application to view and/or automatically execute actions, e.g., initiate bill payments. Accordingly, improvements in technology relating to the automatic execution of actions based on virtual calendar occasion data and classification data are needed.

As will be discussed in more detail below, in various embodiments, systems and methods are described for using machine learning to identify occasions associated with classifications based on virtual calendar occasion data and classification data, and determine and automatically execute actions based on the identified occasions. By training a machine learning model, e.g., via supervised or semi-supervised learning, to learn associations between virtual calendar occasion data and classification data, the trained machine learning model may be usable to automatically execute actions. Such automation results in technical advantages. For example, user errors may be reduced, resulting in increased convenience for users and decreased chances of, for example, missing payments and/or credit score penalties associated therewith. Further, by reducing the number of different applications needed, processing burdens on various computer systems are reduced, and further, there is less exposure of a user's data to additional applications, resulting in increased data security and reduced chances of data breaches or potential other data security threats that result due to increasing numbers of applications and transfers of data between multiple parties.

The disclosures herein result in a technical improvement to a technical problem. Namely, through use of the techniques disclosed herein, a user may be able to access a single interface or application in order to conduct various calendaring activities, view and schedule payments, or perform other actions. For example, the single interface and/or application may be associated with a virtual calendar. The single interface or application may be accessible on (e.g., may be run or executed by) a variety of different smart devices and systems of the user, such as a smart phone, a smart speaker, a smart watch, a smart TV, a smart refrigerator, etc., such that actions and/or integrations associated with the virtual calendar can be performed on and/or are viewable on any of the different devices. Additionally, in some examples, security and identity verification functions for the single interface and/or application can be linked for all of the devices and systems through, e.g., a user's account for the virtual calendar, such that logging out of the user's account via the application on one device may cause all other devices to be logged out of the user's account as well. Such linking may prevent malicious actors from accessing any functionality of or data associated with the virtual calendar on a lost or stolen device.

Further, a user may further give another entity, such as a financial institution, access to the calendar, where the financial institution may then use machine learning models to analyze data received as input from the calendar to determine and/or schedule payments based on the information provided in the calendar events. The financial institution may further be authorized to automatically schedule and initiate payments. While some examples herein may refer to the use of Google Calendar®, such references are merely for explanation only. Rather, any similar such virtual calendar or application now known or later developed may be utilized without departing from the scope of this disclosure. According to aspects of the disclosures herein, a user may quickly and easily give a third party, such as a user's financial institution, access to the user's Google Calendar® application, so that the financial institution can modify or change the calendar to generate reminders, schedule financial events, automatically schedule payments, and so forth. In this manner, an improved application and user interface is provided to the user which is easy to implement and reduces user errors and time delays caused by the need to access or launch multiple different applications. This further avoids the need for the user to log in to multiple applications or calendars dedicated to financial activities, and instead, use the same calendar platform that they are already accustomed to, significantly reducing the chance of errors and improving the user's experience.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "F" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The terms "browser extension" and "plug-in" may be used interchangeably with other terms like "program," "electronic application," or the like, and generally encompasses software that is configured to interact with, modify, override, supplement, or operate in conjunction with other software. As used herein, terms such as "electronic database" or the like generally encompass a structured set of data held in an electronic storage or data store of a computer and which contains data that may be expressed as electronic calendars, schedules, or the like. As used herein, terms such as "occasion" or the like generally encompass representations of events, meetings, objectives, goals, work requirements, or other information that may be represented by data in a database, for example, a scheduled meeting in the context of electronic calendar software. As used herein, terms such as "classification" or the like generally encompass categories, labels, markers, flags, brands, stamps, or other group designations for an occasion, for example, financial-related activities, or physical-fitness related activities.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, a user may be able to create a personal virtual calendar, e.g., Google Calendar®. Again, while some examples herein may refer to the use of Google Calendar®, such references are merely for explanation only. Rather, any similar such virtual calendar or application now known or later developed may be utilized without departing from the scope of this disclosure. A user may give permission to an institution (e.g., a financial institution) to access the personal virtual calendar, for example, by publishing an Internet Calendar Scheduling (ICS) file or calendar file at a link and providing that link to the financial institution. An ICS file or ICS calendar file refers to a universal calendar format that is usable by multiple different known applications, including Microsoft Outlook, Google Calendar®, Notes and Apple Calendar, and so forth. While some examples herein may refer to the use of ICS files or ICS calendar files, such references are merely for explanation only. Rather, any similar such file format now known or later developed may be utilized without departing from the scope of this disclosure. As such, a user may obtain or generate an access link through, for example, Google Calendar®, and then provide that link to the financial institution, in order to give the financial institution access to data associated with the user's calendar. Alternatively, the user could use their existing virtual calendar application or software and invite their financial institution to access or modify their calendar and any underlying data or metadata of the calendar. The financial institution, by having access to the personal virtual calendar, may use one or more machine learning models to analyze the scheduled events in the calendar to, for example, determine whether a calendar event is financially related or requires an action. For example, the financial institution, via a machine learning model, may analyze an event title (e.g., "pay bill to a service provider") and then automatically initiate an action, such as automatically initiating a financial transaction to pay the bill to a third party service provider using funds from the user's bank account with the financial institution. The financial institution may further, at a user's request, use machine learning models to analyze and filter all events on the calendar to only display or show events related to financial activities. A user may further be able to customize one or more features, for example, the user could use specific notes or words in a calendar event to indicate to a financial institution to perform an action. A user logging into a financial institution application may also be able to view a modified version of their personal virtual calendar, filtered to only include financial related events such as bill pay dates or bill due dates. In this manner, a user can manage different aspects of their life without needing to access multiple different applications on a regular basis; instead, the user can access a platform they are familiar with (e.g., Google Calendar®) and then use that single platform to perform or have actions automatically performed accordingly.

While the example above involves financial institutions and financial-related events, it should be understood that techniques according to this disclosure may be adapted to any suitable type of classifications for calendar events, for example, physical or mental fitness-related applications and calendar events. It should also be understood that the examples above are illustrative only. The techniques and technologies of this disclosure may be adapted to any suitable activity.

Presented below are various aspects of machine learning techniques that may be adapted to identify occasions associated with classifications based on virtual calendar occasion data and classification data for subsequent use in determining and automatically executing actions. As will be discussed in more detail below, machine learning techniques adapted to automatically execute actions and provide an improved interface to a user, may include one or more aspects according to this disclosure, e.g., a particular selection of training data, a particular training process for the machine learning model, operation of a particular device suitable for use with the trained machine learning model, operation of the machine learning model in conjunction with particular data, modification of such particular data by the machine learning model, etc., and/or other aspects that may be apparent to one of ordinary skill in the art based on this disclosure.

Figure 1:
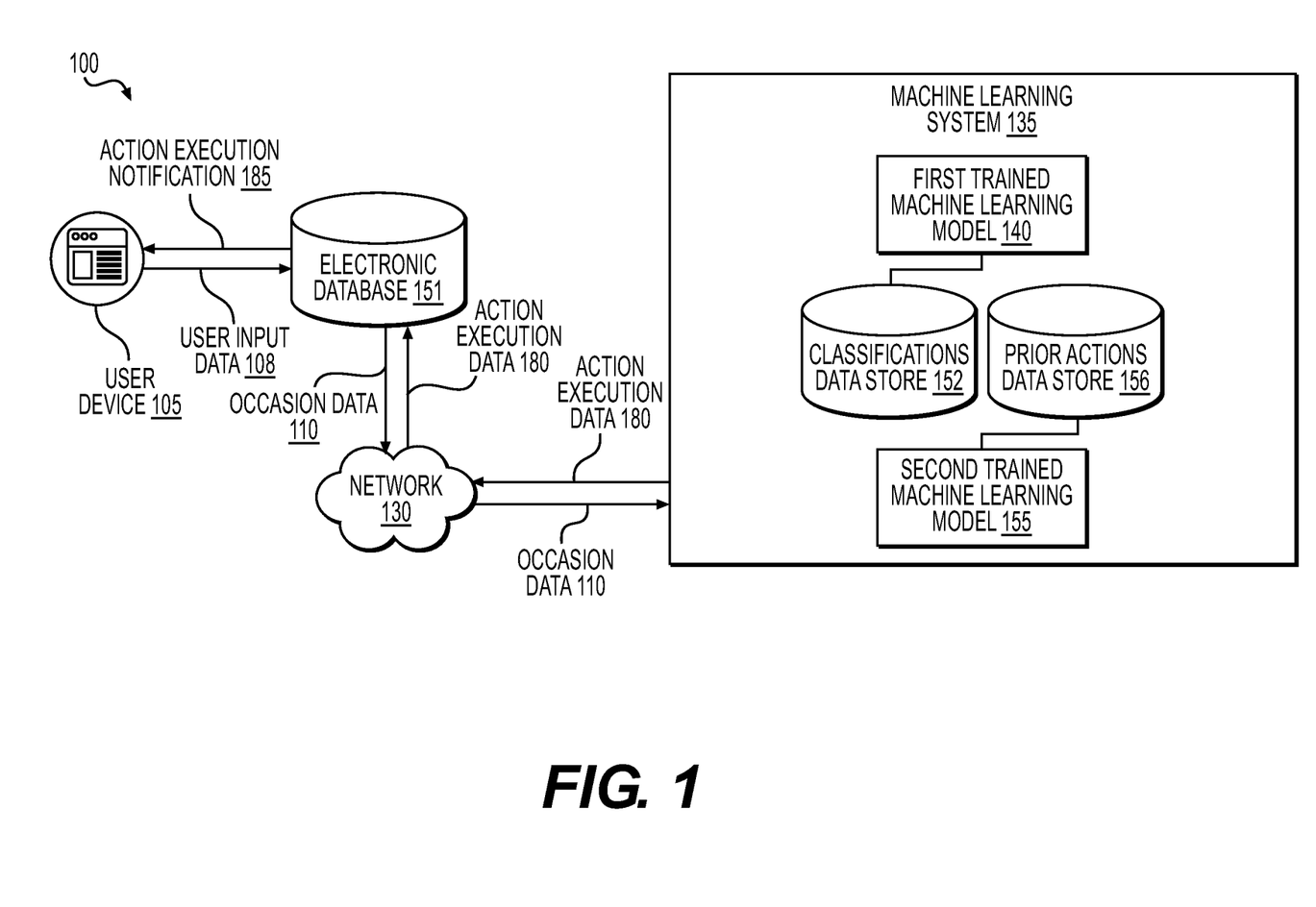
FIG. 1 depicts an exemplary environment for determining actions for automatic execution based on occasions identified from calendar occasion data and classification data using trained machine learning models, according to one or more embodiments.

FIG. 1 depicts an environment 100 that may be utilized with techniques presented herein. A user device 105, electronic database 151, and machine learning system 135 may communicate across an electronic network 130. The user device 105 may be associated with a user, e.g., a user or customer associated with a virtual calendar represented as electronic database 151. The machine learning system 135 may be associated with one or more of generating, training, or tuning one or more machine learning models for identifying occasions associated with classifications based on virtual calendar occasion data and classification data, and determining actions for automatic execution (e.g., based on the identified occasions), generating, obtaining, or analyzing virtual calendar occasion data and classification data, and/or selecting and executing actions (e.g., transmitting a payment, notifying a user of a bill due, etc.). While a single user device 105 and a single electronic database 151 are depicted in FIG. 1, multiple user devices and electronic databases may be implemented in the environment without departing from the scope of this disclosure.

In some embodiments, the components of the environment 100 are associated with a common entity, e.g., a financial institution, transaction processor, merchant, calendar application provider, or the like. In some embodiments, one or more of the components of the environment 100 is associated with a different entity than another. For example, electronic database 151 may be associated with or operated by a third party application, such as Google Calendar®, implemented in part via a user device 105. As another example, according to some aspects, portions of the machine learning system 135 may be implemented by different entities, for example, the first trained machine learning model 140 may be implemented by a party that is different from the party implementing the second trained machine learning model 155. The systems and devices of the environment 100 may communicate in any arrangement. As will be discussed herein, systems and/or devices of the environment 100 may communicate in order to one or more of generate, train, or use a machine learning model to identify occasions associated with classifications based on virtual calendar occasion data and classification data, and determine actions for automatic execution (e.g., based on the identified occasions), among other activities.

The user device 105 may be configured to enable the user to access and/or interact with other systems in the environment 100. For example, the user device 105 may be a computer system such as, for example, a desktop computer, a mobile device, a tablet, etc. In some embodiments, the user device 105 may include one or more electronic application(s), e.g., a program, plugin, browser extension, etc., installed on a memory of the user device 105. One example of the one or more electronic application(s) installed on a memory of the user device 105 is an application associated with the virtual calendar. A user may log in to the application using credentials (e.g., a username and a password) associated with an account of the user for the application. In some embodiments, the electronic application(s) may be associated with one or more of the other components in the environment 100. For example, the electronic application(s) may include one or more of system control software, system monitoring software, software development tools, etc.

In some embodiments, the machine learning system 135 includes and/or interacts with an application programming interface for exchanging data to other systems, e.g., one or more of the other components of the environment 100. The machine learning system 135 may also include a classifications data store 152, a prior actions data store 156, a first trained machine learning model 140, and a second trained machine learning model 155. The classifications data store 152 may include and/or act as a repository or source for classification data. For example, virtual calendar classification data, as discussed in more detail below. The prior actions data store 156 may include and/or act as a repository or source for prior actions data. For example, virtual calendar prior actions data, as discussed in more detail below.

The electronic database 151 may be configured to enable the user of user device 105 to access and/or interact with other systems in the environment 100. For example, the electronic database 151 may be connected to or implemented by the user device 105. According to additional aspects, the electronic database 151 may be connected to or implemented by a computer system separate from the user device 105, such as, for example, a desktop computer, a mobile device, a tablet, etc. According to some aspects of the disclosure, the electronic database 151 may be implemented as part of a cloud data structure. In some embodiments, one or more electronic application(s), e.g., a program, plugin, browser extension, etc., is installed on a memory of the computer system and/or user device 105 connected to and/or implementing the electronic database 151. In some embodiments, the electronic application(s) may be associated with one or more of the other components in the environment 100. The electronic application(s) may include one or more of system control software, system monitoring software, software development tools, scheduling software, communications software, data visualization software, virtual calendar software, etc.

The electronic database 151 may be implemented or stored on a server system, an electronic data system, a computer-readable memory such as a hard drive, flash drive, disk, etc. In some embodiments, the electronic database 151 includes and/or interacts with an application programming interface for exchanging data to other systems, e.g., one or more of the other components of the environment. The electronic database 151 may include and/or act as a repository or source for occasion data, for example, occasion data 110, as discussed in more detail below. Electronic database 151 may receive user input data 108 from a user device 105. For example, a user device 105 may be a smartphone, the electronic database 151 may be a database representing virtual calendar data or a database represented as a virtual calendar, and the user input data 108 may be data indicating an occasion (e.g., a calendar event) input into the virtual calendar. Based on the user input data 108, occasion data 110 may be obtained or received from electronic database 151 via electronic network 130 by machine learning system 135, as described further below. For example, a user, via user device 105, may authorize a machine learning system 135 to access, modify, and/or change occasion data 110 stored on electronic database 151.

In various embodiments, the electronic network 130 may be a wide area network ("WAN"), a local area network ("LAN"), personal area network ("PAN"), or the like. In some embodiments, electronic network 130 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, the machine learning system 135 may one or more of (i) generate, store, train, or use a machine learning model configured to identify occasions associated with classifications based on virtual calendar occasion data and classification data, and determine actions for automatic execution (e.g., based on the identified occasions). The machine learning system 135 may include a machine learning model and/or instructions associated with the machine learning model, e.g., instructions for generating a machine learning model, training the machine learning model, using the machine learning model etc. The machine learning system 135 may include instructions for retrieving occasion data 110 and adjusting occasion data 110 (e.g., based on the output of a machine learning model of the machine learning system 135). The machine learning system 135 may include or receive training data, e.g., training occasion data, and may include or receive ground truth, e.g., training classification data. The machine learning system 135 may include a first trained machine learning model 140 and a second trained machine learning model 155. The first trained machine learning model 140 may be trained to identify an occasion (e.g., calendar event) associated with a first classification (e.g., a financial-related event) based on training data, e.g., training occasion data including prior occasions, and ground truth, e.g., training classification data including prior classifications for the prior occasions. The second trained machine learning model 155 may be trained to determine and automatically execute an action based on training data, e.g., training classification data including prior occasions associated with prior classifications, and ground truth, e.g., prior actions data including prior actions for the prior occasions.

In some embodiments, a system or device other than the machine learning system 135 is used to generate and/or train the machine learning models 140, 155. For example, such a system may include instructions for generating the machine learning models 140, 155, the training data and ground truth, and/or instructions for training the machine learning models 140, 155. One or more resulting trained machine learning models 140, 155 may then be provided to the machine learning system 135.

Generally, a machine learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine learning model, e.g., compare the output of the trained model with the ground truth for that portion of the training data to evaluate an accuracy of the trained model. The training of the machine learning model may be configured to cause the machine learning model to learn associations between training data, e.g., occasion data including prior occasions, and ground truth, e.g., classification data including prior classifications for the prior occasions, such that the trained machine learning model is configured to determine an output classification in response to the input occasion data based on the learned associations. In some instances, different samples of training data and/or input data may not be independent. Thus, in some embodiments, the machine learning model may be configured to account for and/or determine relationships between multiple samples.

Although depicted as separate components in FIG. 1, it should be understood that a component or portion of a component in the environment 100 may, in some embodiments, be integrated with or incorporated into one or more other components. In some embodiments, operations or aspects of one or more of the components discussed above may be distributed amongst one or more other components. Any suitable arrangement and/or integration of the various systems and devices of the environment 100 may be used.

Further aspects of the machine learning model and/or how it may be utilized to identify occasions associated with classifications based on virtual calendar occasion data and classification data and determine actions for automatic execution (e.g., based on the identified occasions) are discussed in further detail in the methods below. In the following methods, various acts may be described as performed or executed by a component from FIG. 1, such as the machine learning system 135, the user device 105, or components thereof. However, it should be understood that in various embodiments, various components of the environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
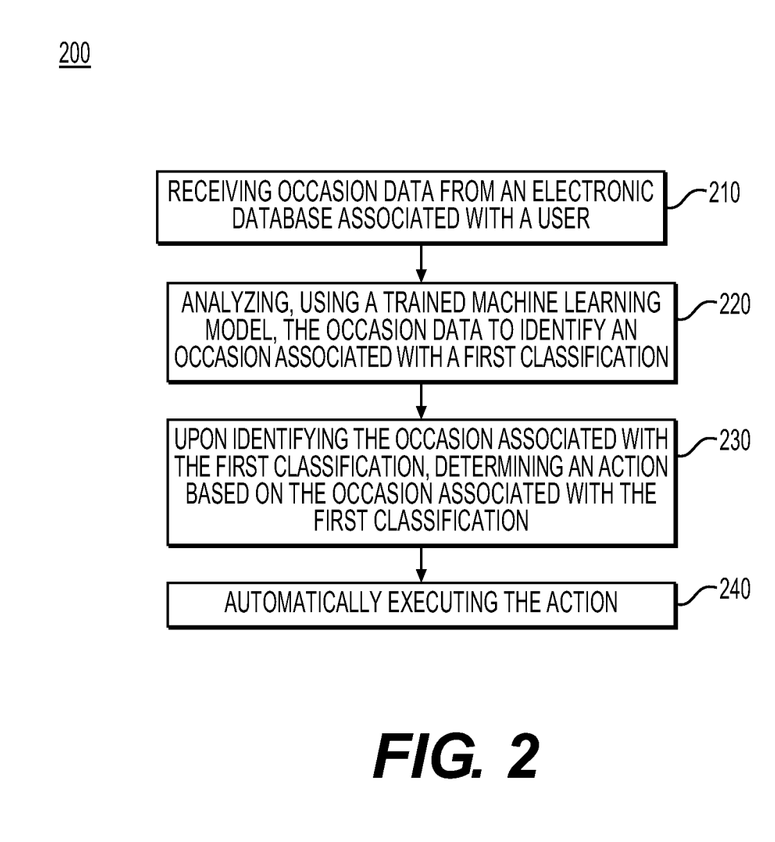
FIG. 2 depicts a flowchart of an exemplary method of determining actions for automatic execution based on occasions identified from calendar occasion data and classification data using trained machine learning models, according to one or more embodiments.

FIG. 2 illustrates an exemplary process 200 for using a trained machine learning model to automatically execute actions, such as in the various examples discussed above. At step 210, the machine learning system 135 may receive occasion data 110 from an electronic database 151 associated with a user (e.g., a user of user device 105). For example, a user may create or operate a virtual calendar application (e.g., Google Calendar®) and add a plurality of calendar events (e.g., occasions). A user may then subscribe to a calendar from a financial institution or otherwise give a financial institution or other entity associated with machine learning system 135 permission to access the virtual calendar application. For example, an Internet Calendar Scheduling (ICS) file or an icon image file format (e.g. ICO or .ico) file representing the electronic database 151 or virtual calendar of the user may be provided to the financial institution. In some cases, the user may tailor the permissions or provide preferences for configuring the virtual calendar. For example, the user may indicate to the financial institution that calendar events with text in the title including "Pay Bill" should be recognized as a trigger for an associated action, for example, to schedule a bill payment. In some embodiments, the user may indicate to the financial institution to use natural language processing (NLP) and provide several options for titles that the machine learning system 135 may then use to parse and analyze the user's virtual calendar. According to some aspects of the disclosure, an electronic database (e.g., virtual calendar) may be configured to publish updates to the machine learning system 135, such that a machine learning system 135 can subscribe to the updates provided by the user's virtual calendar. According to further aspects of the invention, the machine learning system 135 may access the virtual calendar via a browser extension or plug in. For example, a user may download a browser extension or plug-in, allowing a machine learning model to access the electronic database 151 (e.g., virtual calendar). The machine learning model may then modify occasion data on the electronic database 151 as well as present notifications or automatically perform actions as described further below. According to additional aspects of the disclosure, the entity associated with the machine learning system 135 (e.g., the financial entity) may provide software that provides a graphical user interface to a user device 105 to provide instructions to the user for granting permissions to the entity associated with the machine learning system 135.

At step 220, the machine learning system 135 may analyze, using a trained machine learning model (e.g., first trained machine learning model 140), the occasion data to identify an occasion associated with a first classification. For example, the occasion data may be provided as input to the trained machine learning model to obtain, as output of the trained machine learning model, the occasion associated with the first classification. In some embodiments, the trained machine learning model may be trained based on (i) training occasion data that includes information regarding one or more occasions associated with the training occasion data and (ii) training classification data that includes a prior classification for each of the one or more occasions, to learn relationships between the training occasion data and the training classification data, such that the trained machine learning model is configured to use the learned relationships to identify an occasion associated with a first classification in response to input of the occasion data. The training occasion data may be generated based on occasion data 110 received from multiple user devices, and may include, for example, prior calendar events data and associated natural language text. For example, occasion data 110 may include data indicating a location, a website link, a time, a date, a transaction amount, and/or natural language statement describing the occasion.

The first classification may be, for example, financial transactions. The training classification data may be data stored on the classifications data store 152. The training classification data may include data pertaining to occasions that have been previously associated with a particular classification, for example, occasions including natural language statements indicating "pay my bill" "or pay rent" may have previously been classified into a financial transactions classification, while other occasions with natural language statements indicating "visit friends" or "finish my homework" may not be classified into a financial transactions classification. Events indicating or involving a transfer or exchange of funds, a sales or purchase, a deadline to pay bills, expected check deposits, reminders to review bank statements or invoices, and so forth, may all be classified into the financial transactions classification. In other embodiments, the first classification may be physical fitness or health related activities. For example, scheduled exercise times, doctor's appointments, and so forth may fall into this classification.

According to some aspects of the disclosure, the trained machine learning model (e.g., the first trained machine learning model 140) is a natural language processing model, and the trained machine learning model will analyze the occasion for natural language statements as part of the process to determine whether the occasion falls within a first classification, as previously explained. For example, the machine learning model can analyze the occasion and determine that a title or body of the occasion includes the natural language statement "pay my bill." The machine learning model may recognize this statement and proceed to identify the occasion as falling into a first classification, for example, a financial transaction. The machine learning system 135 may further be configured to ignore or disregard certain calendar events that are not relevant to the first classification.

For example, occasions with text indicating to "call mom" or "date night" may be ignored by the machine learning system 135.

At step 230, upon identifying the occasion associated with the first classification, the machine learning system 135 may determine an action based on the occasion associated with the first classification. For example, upon determining that an occasion is financial and associated with a bill to pay, the machine learning system 135 may determine that the action is to initiate a transaction to pay the bill by transferring funds from a user's bank account. The action may also be to modify, remove, or add occasion data to the user's electronic database. For example, after a bill has been paid, the machine learning system 135 may modify the electronic database (e.g., virtual calendar) of a user to remove a corresponding occasion, or modify the occasion to indicate that the action was taken or that the bill has been paid. In this manner, a user can log into their primary virtual calendar application, look at a calendar event requiring an action, and determine whether an action was already taken or whether further action is needed. According to some aspects of the disclosure, the action may be determined based on a user input received via a graphical user interface of a user device 105. For example, a user may specify or provide specific words to the machine learning model to indicate particular actions. In some embodiments, the action may be determined using the second trained machine learning model 155, wherein the second trained machine learning model 155 has been trained based on (i) training classification data that includes information regarding one or more occasions associated with the first classification and (ii) training action data that includes prior actions for each of the one or more occasions associated with the first classification, to learn relationships between the training classification data and the training action data, such that the trained machine learning model is configured to use the learned relationships to determine an action in response to input of the occasion associated with the first classification. The training classification data may include information regarding one or more occasions associated with the first classification which may be stored on the classifications data store 152, as described above. The training action data may include prior actions for each of the one or more occasions associated with the first classification and may be stored on the prior actions data store 156. For example, the prior actions data store 156 may store information regarding a prior action that was taken for a prior occasion, and use that information to train the second trained machine learning model 155, as described above. The action may, according to some aspects of the disclosure, be one or more of: scheduling a bill payment for the user; transmitting a payment from a financial institution account associated with the user to an entity; or transmitting instructions to remove the occasion associated with the first classification from the electronic database 151. Additionally, according to aspects of this disclosure, the action may include transmitting a notification to a user indicating that a planned payment was rejected or that there were insufficient funds in the financial institution account associate with the user. In the cases of insufficient funds or rejection of a payment, a GUI may be presented on the user device 105 requesting an input from the user. For example, the GUI may include a button or other feature to permit a user to acknowledge receipt of the message, log in to their financial account, change the payment or due date of the bill, and/or transfer funds between one or more financial accounts associated with the user. According to further aspects, the training action data may further include prior user input data indicating a prior action for each of the one or more prior occasions associated with the first classification. For example, the machine learning model 155 may be trained to take into account user inputs indicating a past action (e.g., bill was paid) for a particular type of occasion or calendar event, or an occasion containing a particular word or phrase.

According to some aspects, the suggested action may take into consideration payments to a third party at a specified date using a specific account. For example, the machine learning system 135 may suggest the action of transmitting a check by mail to a landlord to pay for rent, using a specified bank account belonging to the user. The machine learning system 135, after parsing the event calendar, may learn that rent is a specific amount that is paid on the first of the month, as well as learn an address or account associated with the landlord. The machine learning model may then parse the calendar, and upon finding additional occasions indicating rent due, may proceed to suggest or determine that the action is to pay rent, and automatically suggest all the additional parameters or information needed to pay rent (address or account of landlord, date to send it to, financial account from which to draw funds, and so forth). According to additional aspects, an amount due may be variable, for example, a utility bill that changes monthly. The machine learning system 135 may be configured to obtain data related to the utility bill and determine an action based on the information. For example, where the utility bill information or account number is provided, the machine learning system 135, with user permission, may obtain the invoice amount and then proceed to pay the invoice. In this manner, the virtual calendar (e.g., electronic database 151) further provides a single interface from which a user can easily manage many aspects of financial or other transactions.

At step 240, the machine learning system 135 may automatically execute the action. Action execution data 180 comprising data pertaining to the executed action may then be generated and sent to the electronic database 151 via electronic network 130. In some embodiments, the machine learning system 135 may further cause to display, via a graphical user interface associated with the user, a notification that the action has been automatically executed, for example, an action execution notification 185. For example, while a user is logged in to their virtual calendar application (e.g., Google Calendar® or Outlook®, etc.), a push notification or other message may be displayed indicating that the action has been executed, e.g., "Your Credit Card statement was automatically paid on January $1^{st}$." In this manner, a user may be notified as actions are automatically executed via action execution notification 185 received by the user at the user device 105. In some embodiments, the machine learning system 135 may propose an action to a user, and the user may choose to accept that action, modify that action, or cancel or refrain from executing that action. For example, the machine learning system 135 may suggest to pay the total balance of a credit card bill. The user could instead modify the action to pay only a minimum balance due, or to apply for a deferral or alternate payment plan. In some embodiments, the machine learning system 135 may present a plurality of options, and allow the user to select one of the plurality for execution. As explained above, an entity associated with the machine learning system (e.g., the financial entity) may provide software that provides a GUI to a user of user device 105 with instructions for providing permissions to the entity associated with machine learning system 135.

In some embodiments, the machine learning system 135 may automatically receive data indicating a change to the occasion associated with the first classification. For example, a user may change, delete, or reschedule an occasion or event. Upon receiving the data indicating the change, the machine learning system 135 may automatically execute a second action based on the data indicating the change. For example, upon changing the date of an occasion involving a bill pay, the machine learning system 135 may execute an action to withdraw an earlier payment, or cancel a future planned payment previously made based on the occasion. Further, according to aspects of this disclosure, the data indicating the change includes or may be generated by user input data 108 received via the graphical user interface from a user of user device 105.

The machine learning system 135 may, according to additional aspects of the disclosure, cause display of graphical depictions of the plurality of occasions on a graphical user interface, for example, a graphical user interface associated with user device 105. The machine learning system 135 may further analyze, using the first trained machine learning model 140, the occasion data to identify all occasions of the plurality of occasions associated with the first classification. The machine learning system 135 may then modify the display to only present graphical depictions of the identified occasions associated with the first classification. Additionally or alternatively, the machine learning system 135 may modify the display to rearrange graphical depictions of the identified occasions associated with the first classification toward a top of the interface or a primary or preferred viewing area of the interface.

Figure 3:
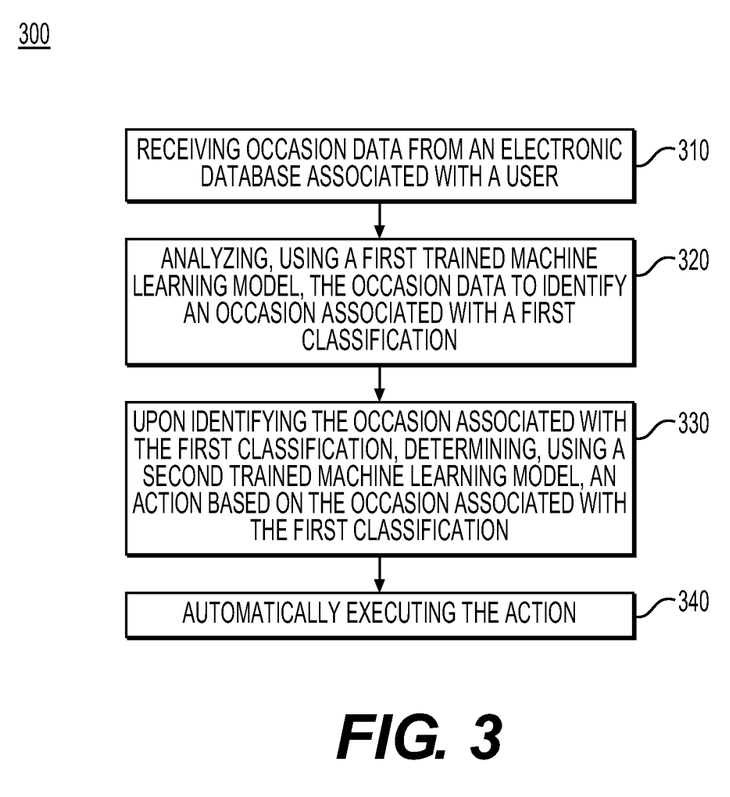
FIG. 3 depicts a flowchart of another exemplary method of determining actions for automatic execution based on occasions identified from calendar occasion data and classification data using trained machine learning models, according to one or more embodiments.

FIG. 3 illustrates an exemplary process 300 for executing actions, e.g., by utilizing a trained machine learning model such as a machine learning model trained according to one or more embodiments discussed above. At step 310, a machine learning system 135 receives occasion data from an electronic database associated with a user as described above with respect to 210. At step 320, the machine learning system 135 may analyze, using a first trained machine learning model 140, the occasion data to identify an occasion associated with a first classification, as described above with respect to 220. At step 330, upon identifying the occasion associated with the first classification, the process 300 may include determining, using a second trained machine learning model 155, an action based on the occasion associated with the first classification as described above with respect to 230. At step 340, the machine learning system 135 may automatically execute the action as described above with respect to 240.

It should be understood that embodiments in this disclosure are exemplary only, and that other embodiments may include various combinations of features from other embodiments, as well as additional or fewer features. For example, while some of the embodiments above pertain to financial-related classifications, any suitable activity may be used. In an exemplary embodiment, instead of or in addition to financial classifications, the classifications include physical or mental-fitness related classifications and actions.

In general, any process or operation discussed in this disclosure that is understood to be computer-implementable, such as the processes illustrated in FIGS. 2 and 3, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 4:
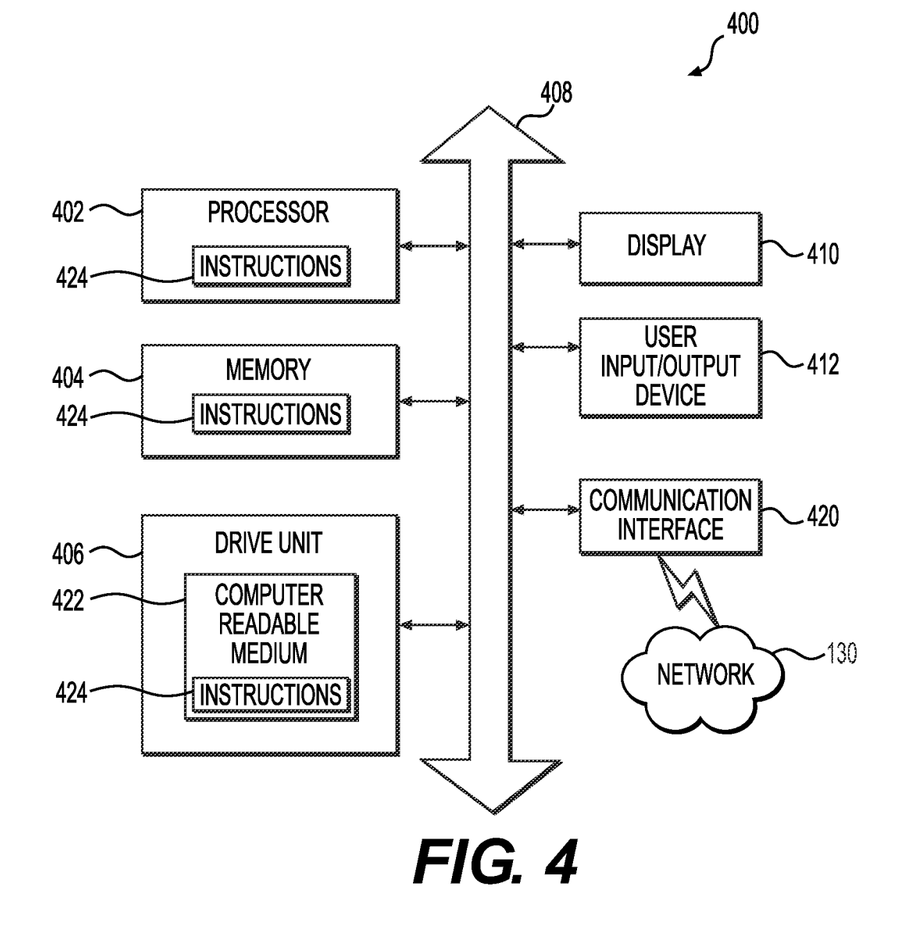
FIG. 4 depicts an example of a computing device, according to one or more embodiments.

FIG. 4 is a simplified functional block diagram of a computer 400 that may be configured as a device for executing the methods of FIGS. 2 and 3, according to exemplary embodiments of the present disclosure. For example, the computer 400 may be configured as the machine learning system 135 and/or another system according to exemplary embodiments of this disclosure. In various embodiments, any of the systems herein may be a computer 400 including, for example, a data communication interface 420 for packet data communication. The computer 400 also may include a central processing unit ("CPU") 402, in the form of one or more processors, for executing program instructions. The computer 400 may include an internal communication bus 408, and a storage unit 406 (such as ROM, HDD, SDD, etc.) that may store data on a computer readable medium 422, although the computer 400 may receive programming and data via network communications. The computer 400 may also have a memory 404 (such as RAM) storing instructions 424 for executing techniques presented herein, although the instructions 424 may be stored temporarily or permanently within other modules of computer 400 (e.g., processor 402 and/or computer readable medium 422). The computer 400 also may include input and output ports 412 and/or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for executing actions based on event data using one or more machine learning models, the method comprising:
    receiving, by one or more processors, occasion data from an electronic database associated with a user, wherein the electronic database includes a plurality of occasions;
    analyzing, by the one or more processors, using a trained machine learning model, the occasion data to identify an occasion associated with a first classification, wherein the trained machine learning model has been trained based on (i) training occasion data that includes information regarding one or more occasions associated with the training occasion data and (ii) training classification data that includes a prior classification for each of the one or more occasions, to learn relationships between the training occasion data and the training classification data, such that the trained machine learning model is configured to use the learned relationships to identify an occasion associated with a first classification in response to input of the occasion data;
    upon identifying the occasion associated with the first classification;
        (i) tuning the trained machine learning model by inputting to the trained machine learning model the occasion associated with the first classification; and
        (ii) determining, by the one or more processors, an action based on the occasion associated with the first classification; and
    automatically executing, by the one or more processors, the action, wherein the action includes modifying the occasion data in the electronic database.

2. The computer-implemented method of claim 1, wherein determining the action further includes determining the action using a second trained machine learning model, wherein the second trained machine learning model has been trained based on (i) training classification data that includes information regarding one or more occasions associated with the first classification and (ii) training action data that includes prior actions for each of the one or more occasions associated with the first classification, to learn relationships between the training classification data and the training action data, such that the trained machine learning model is configured to use the learned relationships to determine an action in response to input of the occasion associated with the first classification.

3. The computer-implemented method of claim 1, further comprising:
    causing to display, by the one or more processors, via a graphical user interface associated with the user, a notification that the action has been automatically executed.

4. The computer-implemented method of claim 3, further comprising:
    automatically receiving, by the one or more processors, data indicating a change to the occasion associated with the first classification; and
    upon receiving the data indicating the change, automatically executing, by the one or more processors, a second action based on the data indicating the change.

5. The computer-implemented method of claim 4, wherein the data indicating the change includes user input data received via the graphical user interface.

6. The computer-implemented method of claim 1, wherein:
the first classification is financial transactions; and
the action further includes one or more of:
scheduling a bill payment for the user;
transmitting a payment from a financial institution account associated with the user to an entity; or
transmitting instructions to remove the occasion associated with the first classification from the electronic database.

7. The computer-implemented method of claim 2, wherein the training action data further includes prior user input data indicating a prior action for each of the one or more occasions associated with the first classification.

8. The computer-implemented method of claim 1, further comprising:
causing to display, by the one or more processors, graphical depictions of the plurality of occasions via a graphical user interface;
analyzing, by the one or more processors, using the trained machine learning model, the occasion data to identify all occasions of the plurality of occasions associated with a first classification; and
modifying, by the one or more processors, the graphical user interface to only present graphical depictions of occasions associated with the first classification.

9. The computer-implemented method of claim 1, wherein the trained machine learning model is a natural language processing model.

10. The computer-implemented method of claim 1, wherein the determining the action based on the occasion associated with the first classification is further determined based on a user input received via a graphical user interface.

11. A computer-implemented method for executing actions based on event data using machine learning models, the method comprising:
receiving, by one or more processors, occasion data from an electronic database associated with a user, wherein the electronic database includes a calendar comprising a plurality of occasions;
causing to display, by the one or more processors, graphical depictions of the plurality of occasions;
analyzing, by the one or more processors, using a first trained machine learning model, the occasion data to identify an occasion associated with a first classification, wherein the first trained machine learning model has been trained based on (i) training occasion data that includes information regarding one or more occasions associated with the training occasion data and (ii) training classification data that includes a prior classification for each of the one or more occasions, to learn relationships between the training occasion data and the training classification data, such that the trained machine learning model is configured to use the learned relationships to identify an occasion associated with a first classification in response to input of the occasion data;
upon identifying the occasion associated with the first classification, determining, by the one or more processors, using a second trained machine learning model, an action based on the occasion associated with the first classification, wherein the second trained machine learning model has been trained based on (i) training classification data that includes information regarding one or more occasions associated with the first classification and (ii) training action data that includes prior actions for each of the one or more occasions associated with the first classification, to learn relationships between the training classification data and the training action data, such that the trained machine learning model is configured to use the learned relationships to determine an action in response to input of the occasion associated with the first classification;
tuning the second trained machine learning model by inputting to the second trained machine learning model the action in response to the occasion associated with the first classification; and
automatically executing, by the one or more processors, the action, wherein the action comprises modifying the calendar in the electronic database to generate one or more of:
a scheduled bill payment for the user;
a reminder to transmit a payment from a financial institution account associated with the user to an entity; or
removal of the occasion associated with the first classification from the electronic database.

12. The computer-implemented method of claim 11, further comprising:
causing to display, by the one or more processors, via a graphical user interface associated with the user, a notification that the action has been automatically executed.

13. The computer-implemented method of claim 12, further comprising:
automatically receiving, by the one or more processors, data indicating a change to the occasion associated with the first classification; and
upon receiving the data indicating the change, automatically executing, by the one or more processors, a second action based on the data indicating the change.

14. The computer-implemented method of claim 13, wherein:
the data indicating the change includes user input data received via the graphical user interface; and
the training action data further includes prior user input data indicating a prior action for each of the one or more occasions associated with the first classification.

15. The computer-implemented method of claim 11, wherein the first classification is financial transactions.

16. The computer-implemented method of claim 15, wherein the action further includes one or more of:
scheduling a bill payment for the user;
transmitting the payment from the financial institution account associated with the user to an entity; or
transmitting instructions to remove the occasion associated with the first classification from the electronic database.

17. The computer-implemented method of claim 11, further comprising:
analyzing, by the one or more processors, using the first trained machine learning model, the occasion data to identify all occasions of the plurality of occasions associated with a first classification; and
modifying, by the one or more processors, a graphical user interface to only present graphical depictions of occasions associated with the first classification.

18. The computer-implemented method of claim 11, wherein the first trained machine learning model is a natural language processing model.

19. The computer-implemented method of claim 11, wherein the determining the action based on the occasion associated with the first classification is further determined based on a user input received via a graphical user interface.

20. A system for executing actions based on event data using machine learning models, the system comprising:
- at least one memory storing instructions; and
- at least one processor executing the instructions to perform a process including:
  - receiving occasion data from a plurality of electronic databases associated with a user, wherein at least one of the electronic databases includes a calendar comprising a plurality of occasions;
  - analyzing, using a trained machine learning model, the occasion data to identify an occasion associated with a first classification;
  - upon identifying the occasion associated with the first classification;
  - (i) tuning the trained machine learning model by inputting to the trained machine learning model the occasion associated with the first classification; and
  - (ii) determining an action based on the occasion associated with the first classification; and
  - automatically executing the action, wherein the action includes modifying the occasion data in the calendar.

* * * * *